Patented May 19, 1931

1,806,419

UNITED STATES PATENT OFFICE

FRANZ RAHN, OF NIEDER-INGELHEIM-ON-THE-RHINE, GERMANY, ASSIGNOR TO THE FIRM C. H. BOEHRINGER SOHN, CHEMISCHE FABRIK, OF NIEDER-INGELHEIM-ON-THE-RHINE, GERMANY, A GERMAN SOCIETY

PURIFICATION OF ACETYLENE

No Drawing. Application filed September 23, 1925, Serial No. 58,187, and in Germany June 19, 1925.

In U. S. Patent No. 1,526,034 the observation has been made that acetylene purified in the usual manner, e. g., by means of chromic acid masses and other substances having an oxidized effect, still contains smaller, hitherto unnoticed quantities of very poisonous impurities, particularly compounds of phosphorus and sulphur.

According to the above-mentioned patent it is possible to remove these quantitatively extremely limited, but highly poisonous, impurities by subjecting the acetylene to a treatment with appropriate means of purification.

In this way the acetylene can be reduced to a form absolutely free from poisonous matters and representing an innoxious narcotic which is excellently suited to surgical and diagnostic purposes.

The object of the present invention is to provide a further process for the production of a narcotic by freeing the acetylene from the last traces of poisonous impurities.

I have found that the poisonous impurities in technical acetylene can be completely removed therefrom by treatment with highly active absorption agents, e. g., active charcoal or active (highly absorbent) silicic acid gel and the like, whereby the acetylene can be converted into the desired poison-free narcotic suitable for surgical and diagnostic purposes.

For the accomplishment of this process especially those adsorption agents have proved suitable which are acid by nature or have been acidified through a preliminary treatment, e. g., with gaseous or liquid acids or acid salts, or which have had their acid qualities intensified.

Furthermore, it has been observed that the process of adsorption preferably should be carried out with the application of dry adsorption agents, wherefore it is also advantageous to treat dry acetylene in a manner in accordance with the invention, or acetylene freed from moisture by a previous treatment.

When carrying the invention into effect one may use as starting material acetylene purified in the usual (technical) way, which contains but small quantities of poisonous compounds of phosphorus and sulphur. One may, however, effect as well the total purification of the acetylene by means of active charcoal or the like; e. g., one may start from crude acetylene produced from carbide.

Examples (1) An adsorption-vessel having a content of 1 liter is filled with dry, coarse-grained active charcoal. Crude acetylene is passed therethrough at a rate of 100 l. per hour. As may be shown by tests with animals (mice), the resulting purified acetylene is entirely free from impurities and thus can be used as a narcotic. After the charcoal has been exhausted, hydrochloric acid gas is passed through. By such a treatment it is possible to regenerate the adsorption agent, after which the latter may be employed anew for treating a subsequent quantity of acetylene.

(2) Active charcoal as used in Example 1 is treated, in a moist or a dry condition, with hydrochloric acid gas, or with liquid hydrochloric acid. After all moisture has been removed, the acidified active charcoal is brought into contact with acetylene in the adsorption-vessel according to Example 1, by passing the impure acetylene therethrough at a rate of about 100 l. per hour. The acetylene so treated is as completely free from poisonous impurities as the product described in Example 1. The duration of the action of acidified active charcoal is a multiple one as compared with that of the ordinary active charcoal used according to Example 1.

In this case, too, a regeneration by treatment with acids may follow the exhaustion of the charcoal. Furthermore, it has proved expedient to work under conditions facilitating the removal of all the moisture accumulated in the adsorption agent during the passage of acetylene therethrough. The application of gaseous hydrochloric acid as a regeneration means will effect a calefaction by which the moisture is expelled, and therefore no special means are generally required in this case for removing the moisture.

Owing to the complete removal of poisonous impurities from acetylene as effected in accordance with the present invention, it is possible to introduce considerable quantities of acetylene so purified into the blood within a short period of time through the inhalation of acetylene-oxygen mixtures, and eventually to saturate it to a maximum.

Unfavorable effects upon the organism or the blood itself will not appear because the entirely purified acetylene is innoxious, as shown by numerous tests, in oppostion to the views prevailing in former times. The non-dangerous treatment which has been rendered feasible as a result of the invention has proved to be especially advantageous, since the acetylene purified conformably to the invention may be used not only as a narcotic for surgical and diagnostic purposes, but also as a therapeutic agent. For example, certain bacteria can be combated successfully by introducing suitable amounts of acetylene into the blood. It has been shown, for instance, that plasmodia of malaria can be destroyed in this way, especially in case the acetylene is introduced into the blood during a malarial paroxysm.

Claims:

1. Process which consists in passing through an active adsorption agent an impure acetylene product consisting of acetylene in admixture with gaseous toxic impurities which are detrimental to the use of said product as a therapeutic and narcotic, said operation being conducted in the absence of any oxidizing gases and of other oxidizing materials.

2. Process as defined in claim 1, in which the active adsorption agent is active charcoal.

3. Process as defined in claim 1, in which the active adsorption agent has an acid reaction.

4. Process as defined in claim 1, in which the operation of adsorption is practiced upon a substantially moisture-free impure acetylene product.

5. Process which consists in treating active charcoal with hydrochloric acid and passing therethrough, under non-oxidizing conditions, a gaseous mixture substantially free of oxidizing gases and consisting essentially of acetylene associated with gaseous toxic impurities.

In testimony whereof I affix my signature.

FRANZ RAHN.